United States Patent

Miyazawa et al.

[11] Patent Number: 5,845,727
[45] Date of Patent: Dec. 8, 1998

[54] DRIVING FORCE AUXILIARY DEVICE

[75] Inventors: Hiroshi Miyazawa; Yutaka Takada; Junichiro Shinozaki; Kuniaki Tanaka; Hiroshi Nakazato; Katsumi Shinkai, all of Nagano, Japan

[73] Assignee: Seiko Epson Corporation, Tokyo, Japan

[21] Appl. No.: 750,279

[22] PCT Filed: Jun. 11, 1996

[86] PCT No.: PCT/JP96/01572

§ 371 Date: Dec. 5, 1996

§ 102(e) Date: Dec. 5, 1996

[87] PCT Pub. No.: WO97/00193

PCT Pub. Date: Jan. 3, 1997

[30] Foreign Application Priority Data

Jun. 14, 1995 [JP] Japan ................................. 7-147921

[51] Int. Cl.[6] ......................................................... B62M 7/00
[52] U.S. Cl. ........................... 180/205; 180/207; 464/57; 464/160; 475/230
[58] Field of Search ............................... 475/3, 4, 5, 8, 475/149, 150, 153, 230; 477/2, 3, 15, 20; 180/205, 206, 207; 464/51, 57, 160, 185

[56] References Cited

U.S. PATENT DOCUMENTS

| | | | |
|---|---|---|---|
| 2,725,759 | 12/1955 | Kreidler | 180/207 |
| 5,024,286 | 6/1991 | Lean et al. | 180/206 |
| 5,375,676 | 12/1994 | Takata et al. | 180/206 |
| 5,474,148 | 12/1995 | Takata | 180/206 |
| 5,570,752 | 11/1996 | Takata | 180/206 |

*Primary Examiner*—Charles A. Marmor
*Assistant Examiner*—Ankur Parekh
*Attorney, Agent, or Firm*—Kanesaka & Takeuchi

[57] ABSTRACT

A driving force auxiliary device for combining a manpower drive force and a motor drive force comprises a manpower drive unit, an auxiliary power drive unit, and a leg power detecting means, wherein the manpower drive unit has a first one-way clutch and an elastic body 16 for transmitting a turning force disposed on a crank shaft to transmit a manpower drive force to an output, gear 17, a motor drive force of the auxiliary power drive unit is added to the manpower drive means at the outer periphery of the crank shaft via a second one-way clutch, and the leg power detecting unit includes first and second rotor members 31, 32 disposed at the front and rear of the elastic body 16, a pair of bevel gears 33, 34 which is interconnected with the first and second rotor members 31, 32 respectively, a bevel gear 35 is disposed to be engaged between the bevel gears 33, 34, an output shaft 37 which is fixed with and intersected at right angles with a supporting shaft 36 for supporting the bevel gear 35, and a sensor 38 connected to the output shaft 37. Thus, a compact driving force auxiliary device can be obtained.

26 Claims, 17 Drawing Sheets

5,845,727

DRIVING FORCE AUXILIARY DEVICE

TECHNICAL FIELD

The invention relates to a driving force auxiliary device which is used for boats and lighter vehicles such as bicycles to reduce a load on a person, such as a leg power, and particularly to the auxiliary device which is made compact.

BACKGROUND ART

Electric bicycles which use an electric motor to assist manpower are attracting attention in recent years. Such an electric bicycle is to reduce a load on a person by having an ordinary bicycle provided with an electric motor, a battery for supplying the motor with power, and a prescribed motor auxiliary power in accordance with the driving force of manpower. This motor's auxiliary driving force does not exceed the driving force by manpower and, when a running speed does not reach 15 Km/h, the motor assists 100%. When the running speed exceeds 15 Km/h, the motor assist is gradually decreased, and when the speed reaches 24 Km/h or more, it is controlled that the motor assist is released.

As shown in FIG. 17, such an electric bicycle is structured on the basis of a common bicycle. Specifically, an electric bicycle 1 has a front wheel 4 and a rear wheel 5 at the front and rear of its frame body, and the rear wheel 5 is driven by a leg power. According to the JIS standard, in the frame body, reference numeral 2 designates a main pipe and reference numeral 3 designates a seat tube. The same names are used in this specification in accordance with the JIS standard.

A driving force auxiliary device 6 comprises an electric motor M which is orthogonal to an axle shaft and disposed at about the middle of the body in the breadth direction, a converting and reduction gear mechanism (not shown) which converts the rotating driving force of the motor to the rotating direction of the axle shaft and reduces the speed, and a combining mechanism (not shown) which combines the reduced motor's driving force with the ordinary drive system by manpower and releases the motor drive system from the ordinary drive system when the bicycle is driven by manpower alone.

The motor drive system is driven to rotate by a power transmission device with the electric motor as a drive source, and the electric motor is supplied with electric power from an electric power device. This electric power device comprises a battery power source using a plurality of storage batteries, a power source circuit for stably supplying electric power, an electric motor for driving, a motor driving circuit for directly controlling the motor rotation, and a control circuit for outputting a speed command to the motor driving circuit. And, the motor driven power by the motor is added to a conventional power transmission device, through which the power is transmitted to the running wheel to run the bicycle.

As a method to detect the driving force by manpower, it is known to use a method which detects the magnitude of the driving force of manpower with reference to a reaction force applied to the gears of a planetary gear (e.g., Japanese Patent Laid-Open Publication No. Hei4-358987).

But, since the bicycle generally has its width with respect to its running direction limited, a conventional electric motor which is relatively long in its longitudinal direction has to be mounted along the longitudinal direction of the bicycle body. Therefore, a rotatable shaft directed to the longitudinal direction of the bicycle body has to be changed to the direction of a crank shaft which is directed in the breadth direction. To do so, a converting mechanism is provided, leading to a tendency to make the reduction gear mechanism complex and large-sized.

The above-described conventional mechanism, which indicates the driving force of manpower in the form of torsion of the shaft and detects it, has a very small torsional displacement magnitude owing to torque, so that the shaft in the longitudinal direction is required to have a prescribed length to secure a sufficient measuring precision. Therefore, it is not preferable because the mechanism tends to be large.

Further, the above-described conventional mechanism performs the above detection at a section where the driving force of manpower is applied, requiring a structure which can withstand the high driving force of manpower, so that there is a disadvantage that the device itself becomes large and heavy.

When a leg power detecting means for detecting the driving force by manpower is exposed out of the bicycle body, there are disadvantages that the means is damaged if the bicycle falls down, or even if it is not damaged, it may suffer from a failure due to a large impact, suffering from low reliability. And, since the bicycle is directly exposed to the influences of external natural environments such as wind and rain and the influences such as dust or mud produced when the bicycle is running, there is the fear of deteriorating reliability such as false detection or shortening of the life of the device. Such problems can be prevented if the leg power detecting means can be accommodated into a casing, but the leg power detecting means must be made compact so as to be disposed near the crank shaft within the casing. But, there was a disadvantage that it is hard to make the leg power detecting means compact while securing required detecting precision.

In view of the above circumstances, the present invention aims to provide a driving force auxiliary device which can accommodate a compact lightweight motor in parallel with a crank shaft within a one-piece casing and a compact leg power detecting means within the casing by properly disposing a reduction gear mechanism to make the whole body compact and incorporating the leg power detecting means into a driving force transmitting mechanism.

SUMMARY OF THE INVENTION

One aspect of the present invention relates to a driving force auxiliary device for combining a manpower drive force and a motor drive force comprising a manpower drive means, an auxiliary power drive means, and a leg power detecting means, wherein:

the manpower drive means has a driving force transmitting mechanism having first and second rotors disposed on the outer periphery of a crank shaft to which a leg force is transmitted, the driving force transmitting mechanism containing a first one-way clutch and an elastic body for transmitting the manpower drive force, the auxiliary power drive means has a motor and a reduction gear mechanism, the driving force from the motor is added to the driving force transmitting mechanism at the outer periphery of the crank shaft via a second one-way clutch, and the leg power detecting means has a sensor or sensors to detect a difference in rotation between the first and second rotors which are disposed at the front and rear of a power transmitting route of the elastic body.

Another aspect of the present invention relates to a driving force auxiliary device, wherein the reduction gear mechanism of the auxiliary power drive means comprises reduction gears which are arranged in a staggered configuration.

Still another aspect of the present invention relates to a driving force auxiliary device, wherein the centers of respective gears of the speed reducing gear train are disposed within a virtual square with a virtual line connecting the motor M and the crank shaft and the outer diameter of the motor as each side.

Yet another aspect of the present invention relates to a driving force auxiliary device, wherein the leg power detecting means comprises a differential gear mechanism, the first and second rotors are interconnected with two shafts of the differential gear mechanism, and a third shaft of the differential gear mechanism is interconnected with a sensor.

Another aspect of the present invention relates to a driving force auxiliary device, wherein a mechanism for mechanically increasing the rotation is disposed in a space between the first and second rotors and the differential gear mechanism or in a space between the differential gear mechanism and the sensor.

Still anther aspect of the present invention relates to a driving force auxiliary device, wherein the differential gear mechanism uses a planetary gear.

Yet another aspect of the present invention relates to a driving force auxiliary device, wherein the leg power detecting means uses an encoder which counts the numbers of revolutions of the first and second rotors, and manpower torque is judged from a difference between the counted numbers of revolutions.

Another aspect of the present invention relates to a driving force auxiliary device for combining a manpower drive force and a motor drive force comprising a manpower drive means, an auxiliary power drive means, and a leg power detecting means, wherein:

the manpower drive means includes
  a first rotor which is coaxially disposed on the outer periphery of a crank shaft and provided with a first one-way clutch to receive a turning force in the forward direction of the crank shaft,
  a second rotor which is coaxially disposed to freely rotate on the outer periphery of the crank shaft,
  an elastic body which is fitted between the first rotor and the second rotor to transmit a turning force of the first rotor to the second rotor, and
  an output gear which receives a turning force of the second rotor;
the auxiliary power drive means includes
  a motor,
  a speed reducing gear train for reducing the driving force of the motor, and
  a third rotor which is coaxially disposed to freely rotate on the outer periphery of the crank shaft, and has its outer periphery teeth engaged with a final gear of the speed reducing gear train and a second one-way clutch disposed on the inner periphery to transmit only the turning force in the forward direction of the final gear to the second rotor; and
the leg power detecting means includes
  a first rotor member fixed to the outer periphery of the first rotor,
  a second rotor member fixed to the outer periphery of the second rotor,
  a pair of first and second bevel gears which is interconnected with the first and second rotor members respectively,
  a third bevel gear which is fitted to be engaged between the pair of first and second bevel gears,
  an output shaft which takes out a change in rotation of the supporting shaft for supporting the third bevel gear with respect to the pair of first and second bevel gears as a difference in motion between the first and second bevel gears, and
  a sensor connected to the output shaft.

The aspect described in claim 9 of the present invention relates to a driving force auxiliary device according to claim 1 or 8, wherein a speed detecting means is fitted to any one of the manpower drive means, the auxiliary power drive means, or the leg power detecting means.

Still another aspect of the present invention relates to a driving force auxiliary device, wherein the manpower drive means, the auxiliary power drive means, and the leg power detecting means are accommodated in a casing.

Yet another aspect of the present invention relates to a driving force auxiliary device, wherein the casing is provided with fins on its forward direction.

Another aspect of the present invention relates to a driving force auxiliary device, wherein the elastic body is a torsion coil spring.

Still another aspect of the present invention relates to a driving force auxiliary device, wherein the elastic body is a torsion coil spring, end faces of the coil spring are radiused, and a member for restricting the deformation of the coil spring is disposed.

Yet another aspect of the present invention relates to a driving force auxiliary device, wherein portions for receiving the end faces of the coil spring are formed in the first and second rotors, and the portions for receiving the end faces of the coil spring are formed in a curved shape.

Another aspect of the present invention relates to a driving force auxiliary device, wherein an angle of torsion of the torsion coil spring is determined to be 20 degrees or below, preferably 10 degrees or below, and when the angle of torsion exceeds the above level, the side faces of respective protrusions formed on the first and second rotors are contacted mutually Still another aspect of the present invention relates to a driving force auxiliary device, wherein the motor of the auxiliary power drive means and the leg power detecting means are disposed on one side of the case, and the gear train of the auxiliary power drive means is disposed on the other side.

Yet another aspect of the present invention relates to a driving force auxiliary device, wherein the motor of the auxiliary power drive means has ends of poles formed in the radial direction of the stator core fixed to the casing.

Another aspect of the present invention relates to a driving force auxiliary device, wherein the sensors of the leg power detecting means are disposed on the outer peripheries of the first and second rotors.

Still another aspect of the present invention relates to a driving force auxiliary device, wherein the casing is made into one body by combining split casings consisting of at least three parts.

Yet another aspect of the present invention relates to a driving force auxiliary device, wherein the maximum width of the casing is determined to be equal to or smaller than the distance between pedal arms of an ordinary bicycle.

Another aspect of the present invention relates to a driving force auxiliary device, wherein a single wiring extracting port is formed on the casing and the wirings from the motor and sensors are taken out of the wiring extracting port.

Still another aspect of the present invention relates to a driving force auxiliary device, wherein the wirings from the motor and sensors are connected with a motor drive circuit and the circuit board of the control via a connector, and the circuit board and the power supply are connected via a connector.

Yet another aspect of the present invention relates to a driving force auxiliary device, wherein the motor, the sensors, and the circuit board of the control are arranged within the casing, and the wirings from them are connected to the power supply disposed outside of the casing via the connectors.

Another aspect of the present invention relates to a driving force auxiliary device, wherein the power supply is disposed on a main pipe, the casing is disposed with the motor opposed to the power supply, and the wiring from the circuit board is connected to the power supply via a connector.

Still another aspect of the present invention relates to a driving force auxiliary device according to claim 23, wherein the power supply is disposed on a seat tube, the casing is disposed with the motor opposed to the power supply, and the wiring from the circuit board is connected to the power supply via a connector.

Yet another aspect of the present invention relates to a driving force auxiliary device, wherein the motor and the circuit board of the control are disposed at the front, top or rear in the forward direction at the time of disposing the casing.

Another aspect of the present invention relates to a driving force auxiliary device, wherein the motor drive circuit and the circuit board of the control are disposed near the motor and on the side of the reduction gear mechanism.

Still another aspect described in claim 28 of the present invention relates to a driving force auxiliary device, wherein an opening is formed on the casing faced to the circuit board, a connector is disposed on the circuit board, and the connector is disposed to face the opening.

Yet another aspect of the present invention relates to a driving force auxiliary device, wherein the power supply is disposed on the main pipe, and the power supply and the circuit board of the control are connected by the casing at the front in the forward direction or the connector disposed above the casing.

The present invention relates to a driving force auxiliary device for combining a manpower drive force and a motor drive force comprising a manpower drive means, an auxiliary power drive means, and a leg power detecting means, wherein when the crank shaft is rotated in the forward direction by a leg force, and this turning force is transmitted to the output gear via the one-way clutch and the elastic body.

On the other hand, the motor drive force of the auxiliary power drive means is added to the manpower drive means via the second one-way clutch at the outer periphery of the crank shaft and transmitted to the output gears.

And, the rotation of the crank shaft in the reverse direction is idled by the first one-way clutch. In the same way, the ordinary rotation of the manpower drive means is not transmitted to the motor by the second one-way clutch.

The leg power detecting means has sensor to detect a difference in rotation between the first and second rotors which are disposed at the front and rear of a power transmitting route of the elastic body, and comprises for example a differential gear mechanism, the first and second rotors are interconnected with two shafts of the differential gear mechanism, and a third shaft of the differential gear mechanism is interconnected with the sensor. Therefore, when the crank shaft is rotated in the forward direction by the leg power, the first and second rotor members which are disposed at the front and rear of the first one-way clutch route are rotated, and the bevel gear or planetary gear of the differential gear mechanism interconnected with them is rotated. When the leg power is high, the elastic body is elastically deformed, and the first and second rotor members produce a difference in advance between them. The differential gear mechanism has the bevel gear or planetary gear fitted to engage, and the difference in advance is converted into an angle of the third shaft, or the output shaft, of the differential gear mechanism. A change in angle of this output shaft is detected by the sensor connected to the output shaft, thereby detecting the magnitude of the leg power, which is fed back to the motor driving force of the auxiliary power drive means.

As described above, the driving force auxiliary device of the present invention has the respective components arranged rationally, so that a compact and lightweight motor can be accommodated in parallel with the crank shaft within the integrated casing, and the reduction gear mechanism can also be arranged properly to make the entire size compact. And, by incorporating the leg power detecting means into the drive force transmitting mechanism, the leg power detecting means can be made compact and accommodated into the casing.

BEST MODE FOR CARRYING OUT THE INVENTION

The present invention will be described with reference to respective embodiments shown in FIG. 1 through FIG. 16.

Figure 1:
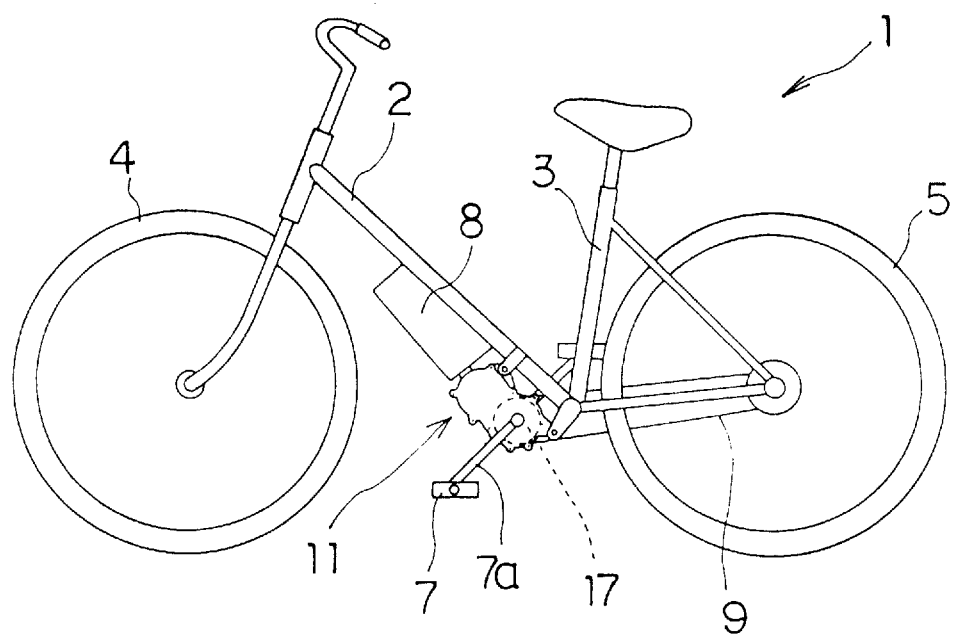
FIG. 1 is a side view showing the entire schematic structure of an electric bicycle using the power unit of the present invention.
Figure 14:
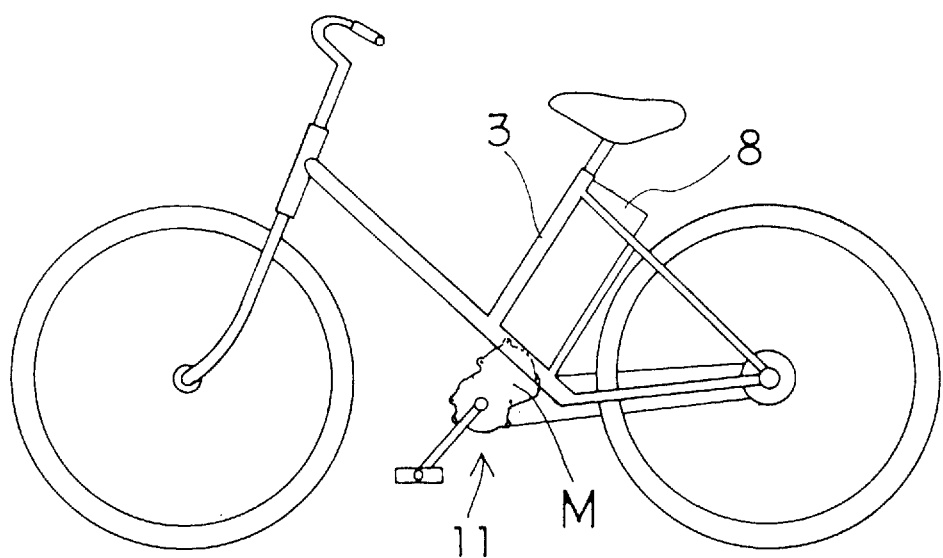
FIG. 14 is a side view showing the entire schematic structure of an electric bicycle using the power unit of the present invention.

Lightweight vehicles to be driven by manpower in respective embodiments include the bicycles as shown in FIG. 1 and FIG. 14. The basic structure of the bicycle to be described here will be common through the respective embodiments to be described afterward.

In this embodiment, an electric bicycle 1 has wheels 4, 5 mounted at the front and rear of its frame in the same way as a conventional bicycle. The frame consists of a main pipe 2 on the front fork side, a seat tube 3 disposed upright from the main pipe 2, and others; and a saddle which is a seat for a rider is mounted on the top of the seat tube 3. And. a power unit 11 provided with a crank shaft 13 is mounted on the underside of the main pipe 2, and a pedal 7 is axially supported at the leading end of a pedal arm 7a mounted on the crank shaft 13. And, a battery unit 8 is also mounted on the underside of the main pipe 2 and in front of the power unit 11.

The power unit 11 accommodates an electric motor, a reduction gear device, a manpower/motor drive force combining mechanism, and a leg power detecting means: the crank shaft 13 to which the pedal 7 is connected is connected to the combining mechanism; and output of the combining mechanism is connected to an output gear (a motive sprocket in this embodiment) 17. And, the motive sprocket and a driven sprocket ( not shown) which is coaxially fixed to the rear wheel 5 are connected by means of a chain 9 which is placed around both sprockets. Basically, brake levers on the handle, a brake mechanism, a light for running at night and others are the same as those used for a conventional bicycle though some of them are not shown on the drawings.

The front wheel 4 is steered by the handle mounted on the front fork, while the rear wheel 5 is driven by the rider who pushes the pedals 7 with feet, so that the electric bicycle is driven by manpower in the same way as an ordinary bicycle. In other words, when the pedals 7 are pushed by the rider, the motive sprocket is rotated, the driving force of the motive sprocket is transmitted to the driven sprocket of the rear wheel via the chain to rotate the rear wheel 5, and the electric bicycle is moved forward.

The battery unit 8 accommodates a main key switch to start the operation of the electric bicycle, a plurality of storage batteries, accessory circuits and others.

The storage batteries are designed to provide a specified voltage such as 24 V for the motor. And, the storage batteries supply power to respective equipment such as the motor, sensors and respective circuits.

A motor drive circuit is mainly configured of an MOS-FET circuit which is a switching element for power. An effective voltage to be supplied to the drive motor is increased or reduced by chopper controlling owing to the high-speed switching operation of the FET circuit, thereby controlling the motor power. And, this switching control is performed according to the instructions from the control circuit determined according to the detected manpower and running speed.

The control circuit consists of a microcomputer which receives sensor signals from the leg power detecting means, a running speed sensor, an outside atmosphere senor and others in the power unit 11 and outputs a control signal to the motor drive circuit. This microcomputer includes an A/D converter for converting each input signal into a digital signal, an I/O port for reading the digital signal into or out of a memory space, a CPU for executing prescribed processing and determination based on the read data signal, a memory and the like. Therefore, based on the detected signals from various sensors, the microcomputer processes according to the program stored in the memory and outputs an appropriate operation command such as a duty set signal to the motor drive circuit.

When the main key switch is turned on by the rider, power is delivered from the battery unit 8 to the mounted respective equipment to enable to compensate the manpower by the electric motor. In other words, when the pedals 7 are pushed by the rider in this state, the leg power detecting means detects a driving force and the speed sensor detects a running speed, and based on the detected signals, the control circuit outputs an appropriate operation command to the motor drive circuit. According to the operation command, the motor drive circuit increases or decreases the driving power to be supplied to the drive motor to adjust the power of the drive motor. And, the produced motor drive force is converted into appropriate torque by the reduction gear mechanism, this motor drive force is added to the manpower drive force by the combining mechanism and transmitted to the rear wheel 5, the electric bicycle is assisted by the motor power to run forward comfortably.

As shown in FIG. 2 to FIG. 5, the power unit 11 has a three-split casing 12 (12a, 12b, 12c) which accommodates the crank shaft 13 to which a pedal arm 7a is fixed, the combining mechanism which is provided with a ratchet disposed on the outer periphery of the crank shaft 13 to prevent the bicycle from reversing when the crank shaft 13 is rotated in the reverse direction and to allow the motor drive system to freely rotate when the motor is stopped, the leg power detecting means disposed on the power transmitting route of the combining mechanism, a manpower assisting motor, and a motor reduction gear device. Each part is provided with a roller bearing or sliding bearing which supports each shaft to allow it to rotate smoothly.

The casing 12 is made of a material such as aluminum which is good in thermal conductivity and lightweight, and consists of the main casing 12a which directly accommodates an electric motor M and the casings 12b, 12c for covering both sides of the main casing 12a airtight And, when the motor M is operated, heating in large quantity involved in the operation of the electric motor is effectively discharged into atmosphere via the casing 12 to provide the stable and continuous operation of the motor. Furthermore, it is preferable to provide a fixing section on the casing near the motor for the frame. Thus, heat can be released to the frame of the bicycle via the casing. The casing 12 is provided with fins 12d along the running direction of the bicycle to enhance a heat-radiating effect.

Figure 6:
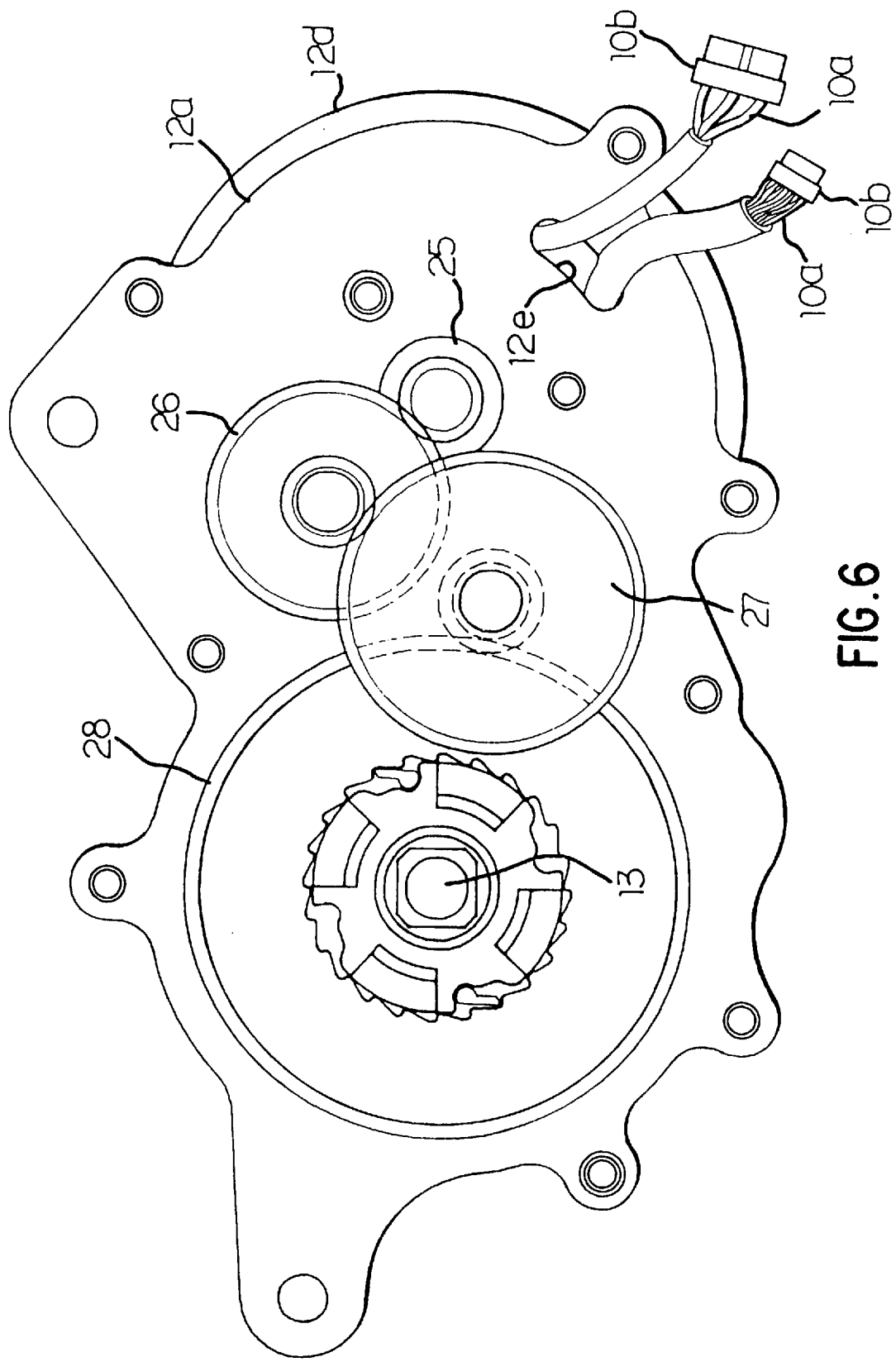
FIG. 6 is a rear elevation showing the power unit of the present invention with its casing partly removed.
Figure 7:
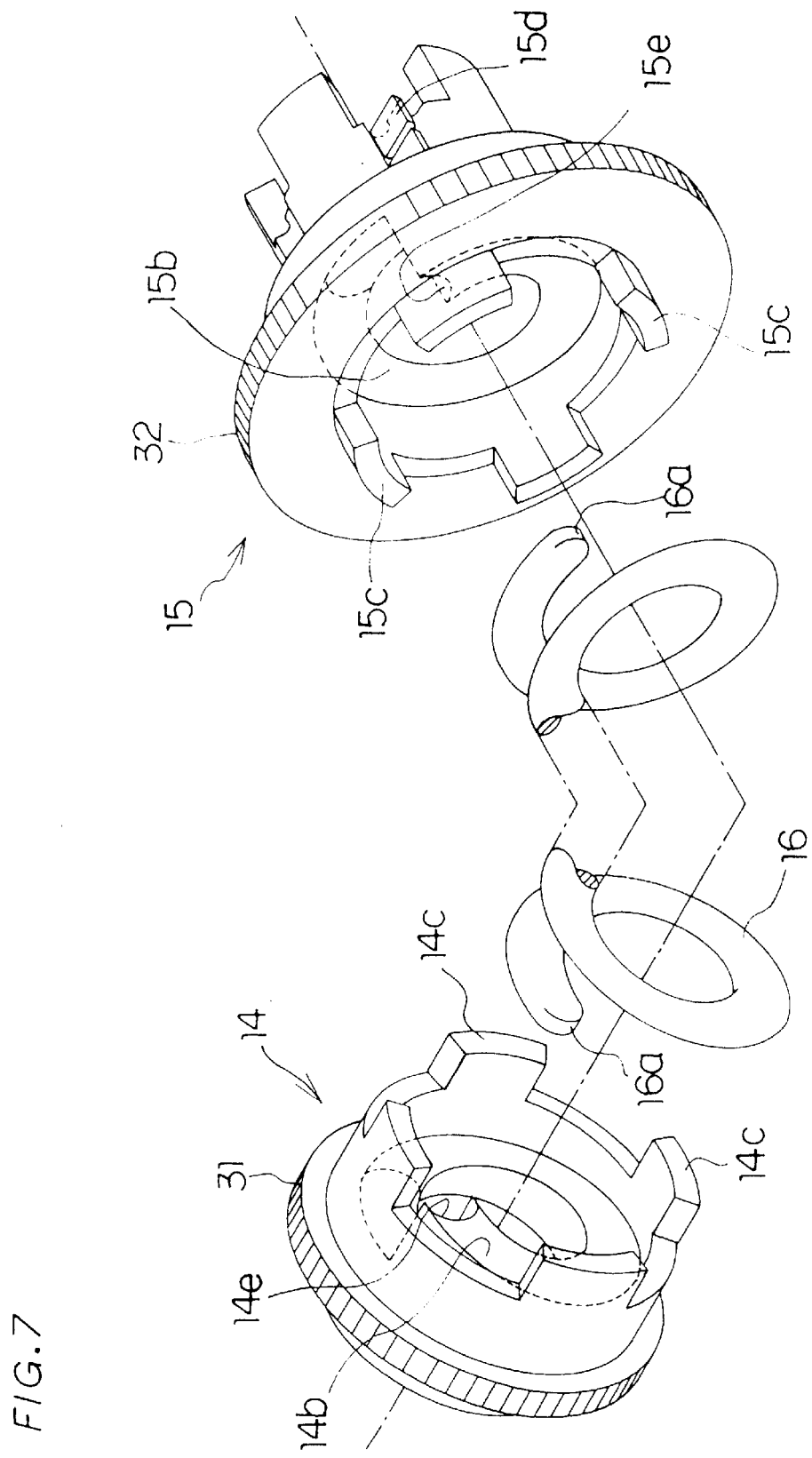
FIG. 7 is a perspective view showing in a disassembled form a first rotor, an elastic body and a second rotor used for the power unit of the present invention.
Figure 8:
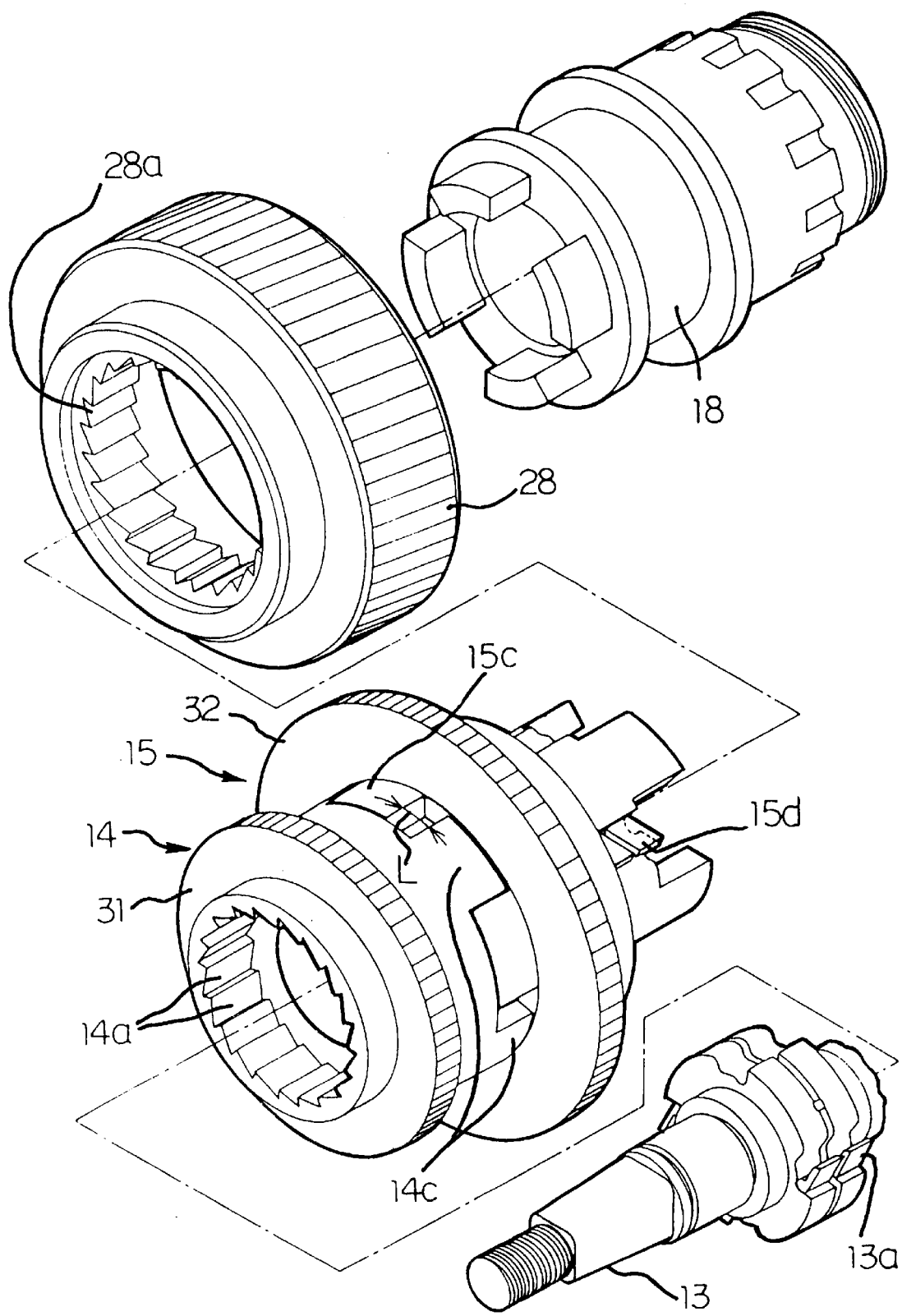
FIG. 8 is an assembling perspective view showing the first rotor and the second rotor used for the power unit of the present invention.

As shown in FIG. 6, power cables and sensor cords (hereinafter referred to as wirings 10a) of the motor M and sensors which are accommodated into the casing 12 are arranged to leave the main casing 12a through a single opening 12e formed on it. In this embodiment, the opening 12e is formed on the casing which is opposed to a circuit board 8a, connectors 10b are lead from the circuit board 8a, and the connectors 10b are positioned near the opening 12e. Thus, assembling ability and maintenance service can be improved. Besides, since the wirings 10a are also connected to other power supply and control by means of the connectors 10b connected to the leading ends of the wirings, assembling ability and maintenance service are improved in the same way.

Furthermore, the circuit board 8a of the control and the motor drive circuit is disposed near the motor and on the side of the reduction gear mechanism within the casing 12 and covered by a case lid 12f to cut off from the outside.

The power unit 11 which is the driving force auxiliary device in this embodiment comprises a manpower drive means which rotates the crank shaft 13 when the pedals 7 are pushed by the rider and transmits the rotation to the motive sprocket which is the output gear 17, an auxiliary power drive means which helps rotate the crank shaft 13 by running the motor M, and a leg power detecting means for determining the application of power by means of the auxiliary power drive means.

Now, the manpower drive means will be described.

The manpower drive means is generally disposed around the crank shaft 13, and includes a first rotor 14 which is coaxially disposed on the outer periphery of the crank shaft 13, a second rotor 15 which is coaxially disposed to freely rotate on the outer periphery of the crank shaft 13, an elastic body 16 which is fitted between the first rotor 14 and the second rotor 15 to transmit a turning force of the first rotor 14 to the second rotor 15, and an output gear 17 which receives a turning force of the second rotor 15. In this embodiment, a cylindrical coupler 18 is used to connect the second rotor 15 and the output gear 17.

And, the first rotor 14 has a first one-way clutch to which only the turning force in the forward direction of the crank shaft is transmitted. The first one-way clutch has outwardly protruded feed pawls 13a formed on the crank shaft 13, and inner periphery teeth 14a each having a sloped surface in the reverse direction formed on the inner periphery of the first rotor 14. Therefore, when the crank shaft 13 is rotated in the forward direction, namely the vehicle is driven forward, the feed pawls 13a of the crank shaft 13 are engaged with the inner periphery teeth 14a of the first rotor 14 to transmit the driving force. On the other hand, when the crank shaft 13 is rotated in the direction that the drive motor is operated in the opposite direction, namely the vehicle is reversed, the feed pawls 13a move along the sloped surfaces of the inner periphery teeth 14a and do not engage with the inner periphery teeth 14a, so that the crank shaft 13 is freely rotated, the driving force of the reverse rotation is not transmitted to the first rotor 14, and the rear wheel 5 is not rotated reversely.

As described above, the first rotor 14 and the second rotor 15 are connected by means of the elastic body 16, specifically a torsion coil spring in this embodiment. This torsion coil spring is a spring which is made of a prescribed material into a spiral shape having a prescribed size to provide a prescribed spring constant and to produce torque corresponding to a turning angle.

This coil spring has its either end face 16a radiused, and portions 14e, 15e are formed in a curved shape to receive respective end faces 16a of the coil spring. Therefore, the end faces 16a of the coil spring can be stably brought into contact with these portions 14e, 15e for receiving them.

In addition, in this embodiment, it is devised to keep the posture of the torsion coil spring when it is elastically deformed so as to prevent it from being deformed exceeding a proper level. Namely, there is disposed a member which retains the posture of the coil spring so as to have an ideal deformation and prevents it from being deformed exceeding a proper level when the torsion coil spring is elastically deformed by the force exerted. In this embodiment, the deformation of the coil spring is restricted by spiral grooves 14b, 15b formed on the inner walls of the first and second rotors 14, 15, the inner peripheries of protrusions 14c, 15c to be described afterward, and the outer periphery of the crank shaft 13. In other words, the spiral grooves 14b, 15b corresponding to the torsion coil spring are formed on the inner end faces in the axial direction of the first rotor 14 and the second rotor 15, the ends of the torsion coil spring or the elastic body 16 are restricted by the spiral grooves 14b, 15b, the outer periphery of the elastic body 16 is restricted by the inner peripheries of protrusions 14c, 15c, and the inside section of the elastic body is restricted by the outer periphery of the crank shaft 13.

Accordingly, at the time of transmitting the manpower to be described afterward, this torsion coil spring is elastically deformed to transmit the driving force of manpower. And, since the coil spring is in contact with the spiral grooves 14b, 15b or in contact with the inner peripheries of the protrusions 14c, 15c or in contact with the outer periphery of the crank shaft 13, it is prevented from falling in the axial direction or being deformed in an odd shape and held in shape what it should be, thereby securing a prescribed spring constant. In this embodiment, the driving force of manpower is transmitted while pushing the end faces of the torsion coil spring, but it may be transmitted while pulling the end faces of the coil spring. Furthermore, the elastic body 16 is not limited to the torsion coil spring but may be any type as long as it is a spring which can produce torque corresponding to a turning angle.

And, in this embodiment, an angle of torsion of the torsion coil spring is determined to be 20 degrees or below, preferably 10 degrees or below so that rider does not have an unusual feeling.

Thus, in response to the driving torque applied to the first rotor 14, the torsion coil spring is elastically deformed according to its spring constant to transmit the driving force to the second rotor 15. As a result, according to the torque, the turning angles of both rotors which have a differential motion are detected by a leg power detecting means 30 to be described afterward to detect a leg power. Specifically, first and second rotor members 31, 32 having a different diameter are fixed onto the outer peripheries of the first and second rotors 14, 15 respectively and engaged with input gears 41, 42 of the leg power detecting means 30. In this embodiment, the first and second rotor members 31, 32 are gears.

And, the protrusions 14c, 15c are circularly disposed at prescribed intervals to oppose mutually on the first and second rotors 14, 15 to secure a prescribed clearance L when a leg power is small and the elastic body 16 does not produce any torque. Thus, it is designed that if an excess driving force is applied by manpower or the like, the side faces of the protrusions 14c, 15c are directly contacted and connected mutually in order to prevent the torsion coil spring from being broken.

As described above, the second rotor 15 is coupled with the cylindrical coupler 18. In this embodiment, the second rotor 15 and the cylindrical coupler 18 are made of a separate material, but they may be produced integrally.

In this embodiment, the first and second rotor members 31, 32 are gears as shown on the drawings. The first and second rotor members 31, 32 are not limited to the gears but may be any rotor members such as a roller which can transmit the rotation.

Now, the auxiliary power drive means will be described.

The auxiliary power drive means comprises the motor M, a speed reducing gear train for reducing the driving force of the motor, and a third rotor which is coaxially disposed to freely rotate on the outer periphery of the crank shaft 13, and has its outer periphery teeth engaged with a final gear of the reduction gears and a second one-way clutch disposed on the inner periphery to transmit only the turning force in the forward direction of the final gear to the second rotor 15.

Figure 4:
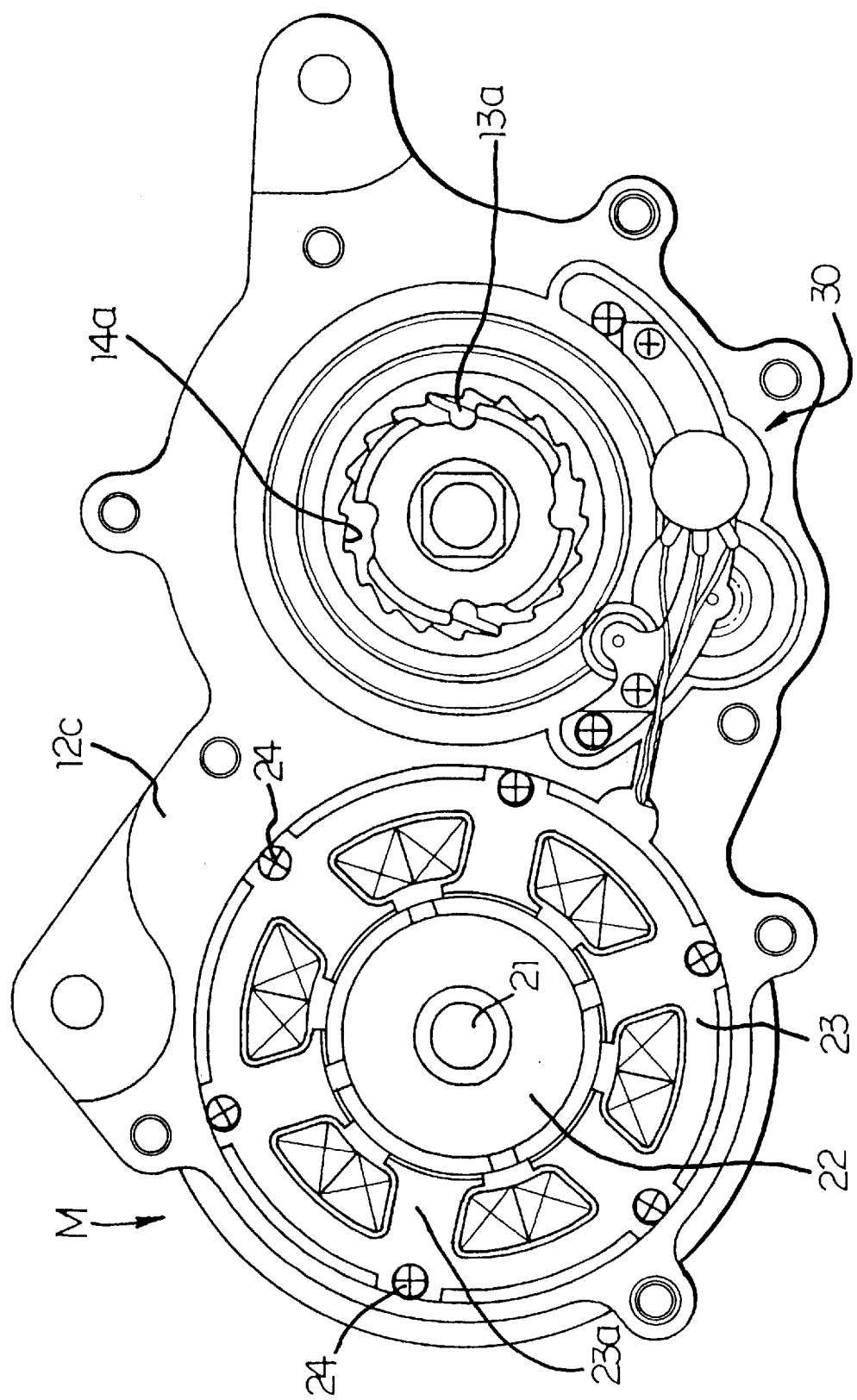
FIG. 4 is a front view showing the power unit of the present invention with its casing partly removed.

The motor M comprises a rotor core 22 which is fixed to a motor shaft 21 by means of a key and has a magnet, and a stator core 23 which is disposed around the outer periphery of the rotor core 22 and directly fixed to the casing 12a. As shown in FIG. 4, the stator core 23 has ends of its radial poles 23a fixed to the inner part of the casing with bolts 24 which are parallel to the motor shaft. In other words, considering the positions of lines of magnetic force passing through the stator core 23, the parts having a low flux density of the lines of magnetic force are connected to the casing with the bolts 24, thereby minimizing adverse effects such as a hindrance to the magnetic flux or the like by forming bolt-holes and disposing the bolts, so that the motor performance can be prevented from being lowered. And, since the special motor casing is not required, it is possible to make the size compact.

The speed reducing gear train comprises a first gear unit 25 fixed onto the motor shaft 21 of the motor M, and second and third gear units 26, 27 which are sequentially engaged with the first gear unit: they are so configured that a small-diameter helical gear is engaged with and driven by a large diameter helical gear, so as to deal with a high-speed rotation and attain a prescribed reduction gear ratio.

Figure 5:
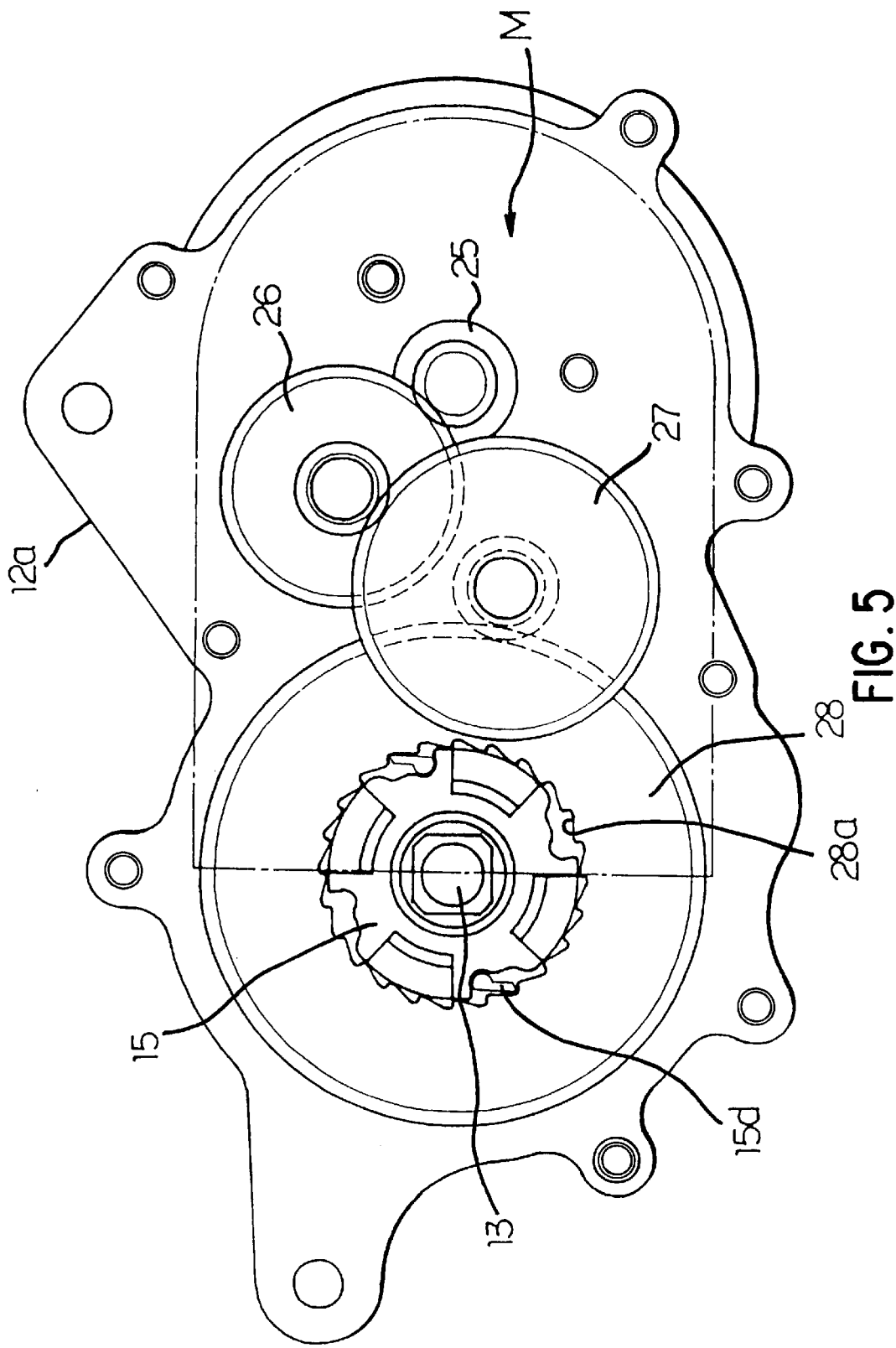
FIG. 5 is a rear elevation showing the power unit of the present invention with its casing partly removed.

In this embodiment, the centers of respective gears of the speed reducing gear train are disposed within a substantially virtual square indicated by an alternate long and short dash line in FIG. 5 with a virtual line connecting the motor M and the crank shaft and the outer diameter of the motor as each side. Further, the reduction gears are arranged in a staggered configuration. By arranging in such a way, the auxiliary power drive means can be made compact.

And, a third rotor 28 is engaged with the third gear unit 27 which is the reduction gear and disposed on the outer periphery of the second rotor 15. The third rotor 28 has inner periphery teeth 28a each having a sloped surface in the forward direction formed on its inner periphery.

On the other hand, the second rotor 15 is provided with outwardly protruded feed pawls 15d, so that the inner periphery teeth 28a are engaged with the feed pawls 15d on the outer periphery of the second rotor 15 only when the third rotor 28 is rotated in the forward direction.

Therefore, when the crank shaft 13 is rotated in the forward direction by the manpower and the motor driving is stopped according to the running speed conditions and the like, the third rotor 28 is freely rotated, so that the driving force by manpower is not transmitted to the motor drive system.

Since the auxiliary power drive means is configured as described above, output obtained by the electric motor can be converted into appropriate torque/rpm by a mechanical reduction gear mechanism, and this driving force can be transmitted efficiently to the combining mechanism to assist the manpower to drive the rear wheel 5.

Now, the leg power detecting means 30 will be described with reference to the embodiment shown on the drawings.

Figure 9:
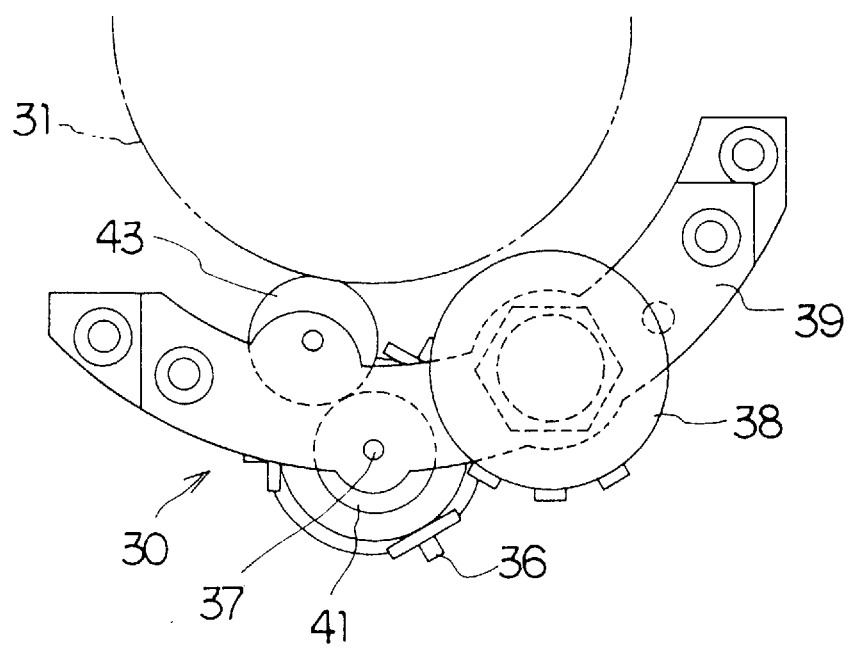
FIG. 9 is a front view showing a leg power detecting means used for the power unit of the present invention.
Figure 10:
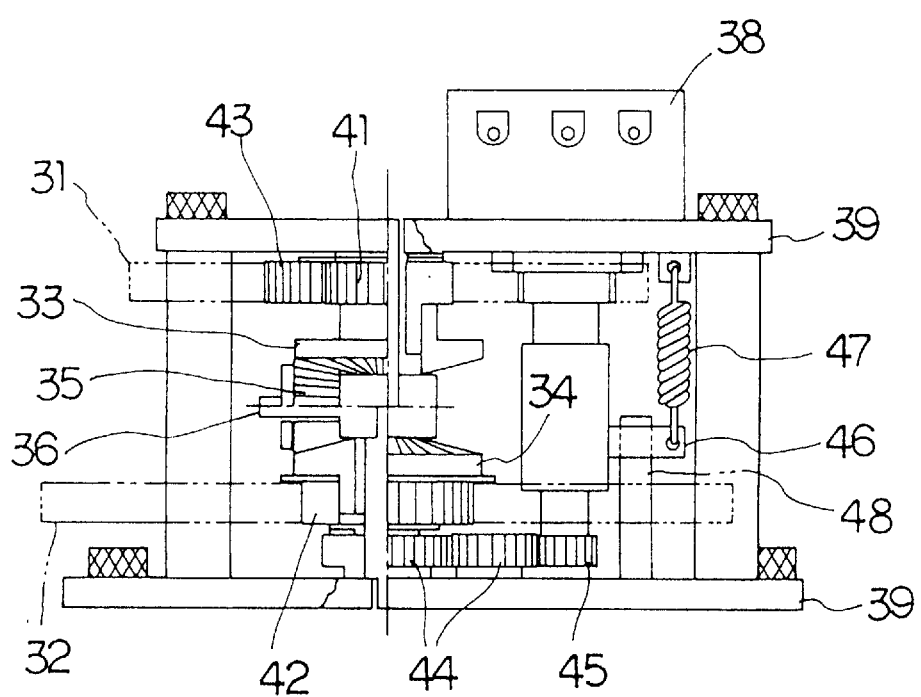
FIG. 10 is a bottom view showing a leg power detecting means used for the power unit of the present invention.
Figure 11:
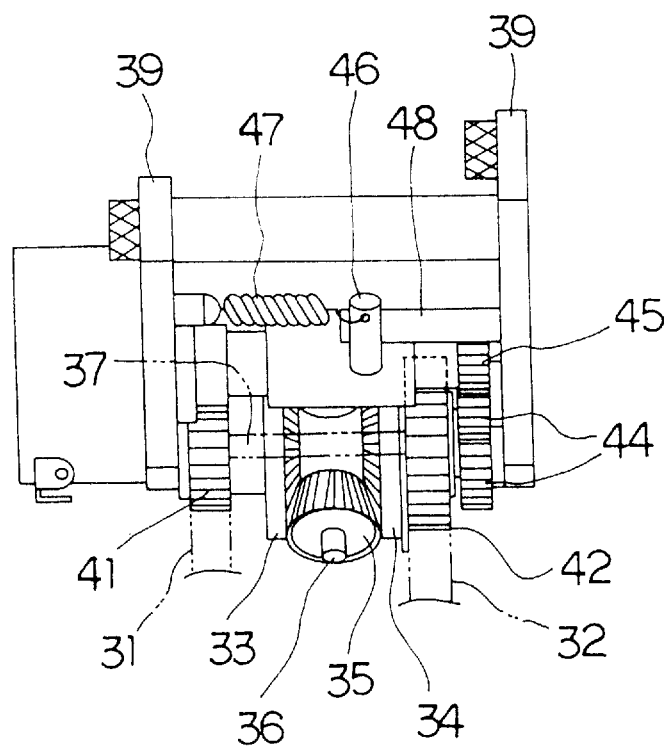
FIG. 11 is a right side view showing a leg power detecting means used for the power unit of the present invention.

In this embodiment, the leg power detecting means 30 judges manpower torque in view of a difference in rotation between the first and second rotors 14, 15 which are mutually connected via the torsion coil spring. As shown in FIG. 9 to FIG. 11, the leg power detecting means 30 is basically provided with a differential gear mechanism, the first and second rotors 14, 15 are interconnected with two shafts of the differential gear mechanism, and a third shaft (output shaft 37) of the differential gear mechanism is interconnected with a sensor. As specified in the JIS standard, the differential gear mechanism is a gearing in that when two shafts are driven, the third shaft is simultaneously driven by these two shafts, and a planetary gearing is used. It is often said that to attain differential motion, a sun gear and a planetary gear are used as a bevel gear. And, in this embodiment, a bevel gear is used for the differential gear mechanism as described afterward.

Specifically, the leg power detecting means 30 comprises the first rotor member 31 (a gear in the embodiment) fixed to the outer periphery of the first rotor 14, the second rotor member 32 (a gear in the embodiment) fixed to the outer periphery of the second rotor 15, a pair of bevel gears 33, 34 which is interconnected with the first and second rotor members respectively, a plurality of bevel gears 35, 35 which are engaged between the above pair of bevel gears, an output shaft 37 which is fixed with and intersected at right angles with a supporting shaft 36 for supporting the above bevel gears, and a sensor 38 connected to the output shaft.

In this embodiment, the output shaft 37, which is the third shaft of the leg power detecting means 30, is formed in the shape of an arc and supported between frames 39, 39 which are disposed in parallel with each other, the first input gear 41 is rotatably fitted with play to the output shaft 37, and the supporting shaft 36 is rotated together with the output shaft 37.

The first and second input gears 41, 42 have the bevel gears 33, 34 fixed respectively, and the bevel gears 35, 35 engaged between the bevel gears 33, 34 as described above.

And, the first and second input gears 41, 42 are interconnected with the first and second rotor members 31, 32 which have a different diameter. And, the second input gear 42 is directly engaged with the second rotor member 32, while the first input gear 41 is engaged with the first rotor member 31 via a reversing gear 43 having a small diameter. This configuration is required to have the first and second rotor members 31, 32 with a different diameter because it is necessary to rotate the bevel gears 33, 34 at the same rotating speed in a different direction, so that either of the first and second rotor members 31, 32 which are rotated in the same direction is reversed, and a space for disposing the reverse gear to effect the reverse rotation is required.

In addition, in the gear train of the first and second rotor members 31, 32, the first and second input gears 41, 42 and the reversing gear 43, the number of teeth is determined so that the rotations of the first and second rotor members 31, 32 are increased and given to the first and second input gears 41, 42. Besides, the output shaft 37 is interconnected with a detecting gear 45 of the sensor 38 (a potentiometer in this embodiment) via gears 44 for increasing the rotation.

When a mechanism for mechanically increasing the rotation is disposed in the space between the first and second rotors 14, 15 and the differential gear mechanism or in the space between the differential gear mechanism and the sensor 38 or in both spaces as in this embodiment an electrical signal with higher precision can be attained as absolute quantity to be entered into the sensor is larger at the time of converting into an electrical signal by the sensor.

In connection with a difference in advance between the first rotor 14 and the second rotor 15 according to the torque produced by the torsion coil spring owing to the manpower, since the engaged and interconnected bevel gear 35 is turned and moved around the output shaft 37, the output shaft 37 is turned for a turning angle corresponding to the difference in advance. Namely, when the first rotor 14 and the second rotor 15 have the same rotating speed, the bevel gear 35 continues to rotate with the output shaft at an angle position, but when they have a different rotating speed, it can be assumed that one of them is stopped relatively, while the other is rotated. According to this difference in rotation, the bevel gear 35 is turned and moved around the output shaft 37, and the supporting shaft 36 of the bevel gear 35 is rotated for an angle corresponding to the difference in rotation. And, this angle is increased in speed and transmitted to the gear 45 of the potentiometer by the gears 44, thus enabling to accurately measure the drive torque by the manpower.

It is to be understood that the differential gear mechanism may use a planetary gear instead of the bevel gear.

An arm member 46 is protruded sideward from the middle of the detecting shaft of the potentiometer. The arm member 46 is connected to one end of an energizing spring 47 whose other end is fixed to the arm, and a stopper member 48 is disposed in contact with the arm member 46. Therefore, the detecting shaft of the potentiometer is always kept energized in one direction by the energizing spring 47 and fastened by the stopper member 48, so that the zero point compensation of the potentiometer can be secured and respective gears can be prevented from being loosened. Thus, the manpower torque can be measured with sufficient precision.

Another embodiment of the leg power detecting means will be described. The leg power detecting means in this embodiment has an encoder to count the numbers of revolutions of the first rotor 14 and the second rotor 15 and judges manpower torque from a difference between the counted numbers of revolutions.

Figure 12:
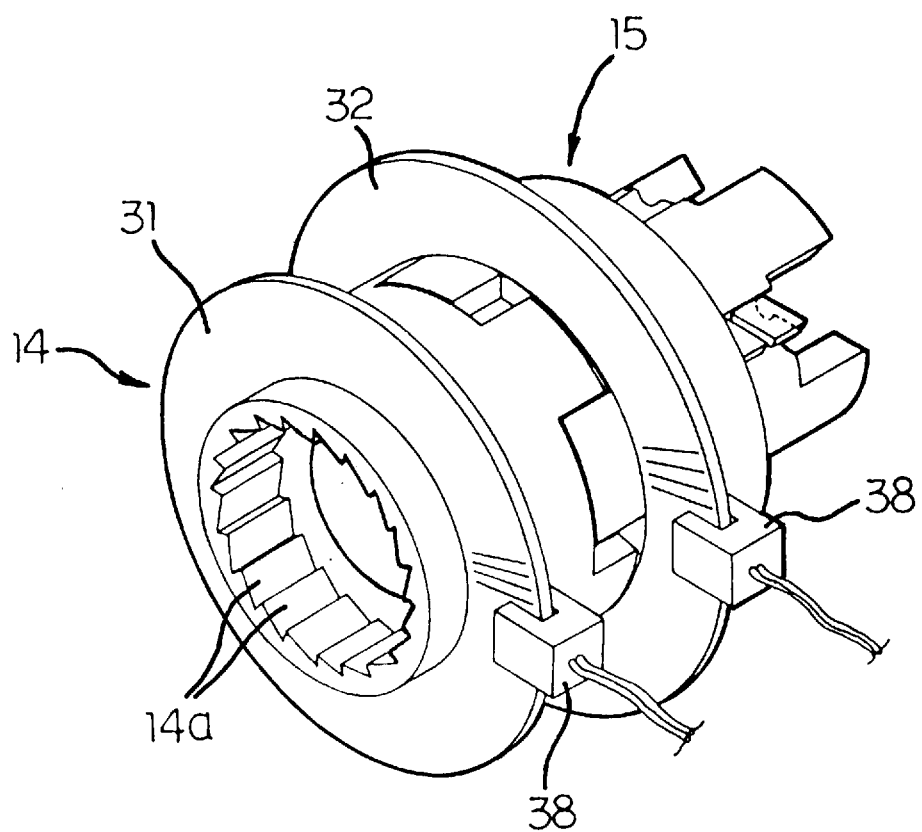
FIG. 12 is a perspective view showing another embodiment of the leg power detecting means used for the power unit of the present invention.
Figure 13:
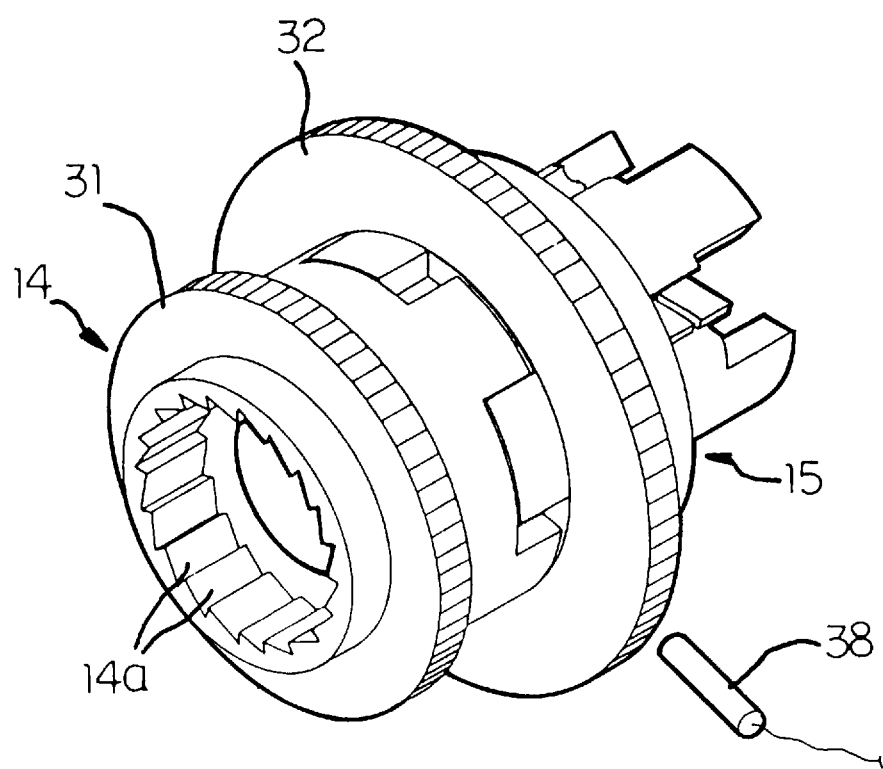
FIG. 13 is a perspective view showing a speed detecting means used for the power unit of the present invention.

Specifically, as shown in FIG. 12, detection discs (first and second rotor members 31, 32) having prescribed radial slits are disposed on the outer peripheries of the first rotor 14 and the second rotor 15, and a photo-interrupter revolution detecting sensor 38 having a light emitting diode and a phototransistor is disposed to sandwich each detection disc. Therefore, when the first and second rotors 14, 15 are rotated by the transmitted driving force of manpower, the number of slits passing by each encoder is counted, and the torque of manpower is determined from the difference in the counted numbers of slits. Specifically, as the respective rotors 14, 15 are rotated, the detection discs are rotated, the slits of the respective detecting discs are passed through the sensors 38, the light from the light emitting diode reaches the phototransistor through the slits, a detection signal is outputted from the phototransistor, and according to a difference in the counted numbers, the torque of manpower can be judged based on a difference in the numbers of rotations of the first and second rotors 14 15, namely with the spring constant of the torsion spring added.

Therefore, with the rotations of the detecting discs disposed for the respective first and second rotors 14, 15, the encoders count the slits moving in rotating motion, so that an analog-digital converter or the like can be omitted, enabling the simplification of the circuit configuration. And, since the torque of manpower is detected based on the difference in the counted numbers by the encoders, the torque of manpower can be detected even from a stopped state.

And, a common proximity sensor can also be used for the configuration. Specifically, a detection disc having N and S poles alternately magnetized in the circumferential direction and a magnetic sensor using a Hall element near the detection disc can be disposed. Thus, even when the first and second rotors 14, 15 are slightly rotated, a rotation pulse signal can be obtained and the numbers of revolutions can be counted.

And, the configuration of this embodiment can also be used for a speed sensor to detect the running speed of the electric bicycle. Specifically, the running speed when the bicycle is being driven by the manpower can be judged from the detected output of either of the rotors 14, 15.

Now, description will be made of the transmission of the driving force by the power unit 11 of the electric bicycle.

First, the transmission of the driving force of manpower will be described, and then the transmission of the motor drive force for assisting the manpower will be described.

When the pedals 7 are driven in the forward direction by the rider, the crank shaft 13 is rotated in the forward direction. The rotating driving force of manpower is transmitted to the first rotor 14 through a ratchet (first one-way clutch) disposed between the crank shaft 13 and the first rotor 14, and the first rotor 14 is rotated forward. At this time, if the pedals 7 are driven in the reverse direction by the rider, the crank shaft 13 is rotated in the reverse direction but the feed pawls 13a of the crank shaft 13 are not engaged with the first rotor 14. Thus, the first rotor 14 is not driven to rotate.

When the first rotor 14 is rotated, the second rotor 15 is rotated via the torsion coil spring (elastic body 16). At this time, a difference in advance delayed due to the elastic torsion of the torsion spring for the torque produced between both rotors is detected by the leg power detection means 30, and the auxiliary driving force of the motor is determined based on the leg power and the running speed.

Besides, the second rotor 15 rotates the connected coupler 18 to rotate the motive sprocket (output gear 17) which is connected to the coupler 18. At this time, since the second rotor 15 and the third rotor 28 disposed on the outer periphery of the second rotor 15 are not engaged by the ratchet (second on-way clutch) between them, the driving force of manpower is not transmitted to the motor drive system through the third rotor 28.

Finally, the rear wheel 5 is rotated by the chain 9 connected to the motive sprocket (output gear 17).

And, when the manpower is applied as described above and the leg power and the running speed are within a prescribed auxiliary range, a prescribed command is outputted from the control based on the running speed and the driving force of manpower to operate the motor M, thereby supporting the manpower.

Specifically, the motor M is driven, the driving force of the motor is transmitted to the third rotor 28 via the speed reducing gear train, through which the driving force is converted into an appropriate number of revolutions/torque. And, the inner periphery teeth 28a of the third rotor 28 are engaged with the feed pawls 15d of the second rotor 15, the driving force of the motor with its speed lowered is transmitted to the second rotor 15, and the driving force of the motor is added to supplement the driving force of manpower. And, this state is kept until the manpower driving is stopped or the running speed exceeds a prescribed range.

Preferred embodiments of the invention will be described below.

The motor M of the auxiliary power drive means and the leg power detecting means 30 are disposed on one side of the case, and the speed reducing gear train of the auxiliary power drive means is disposed on the other side. Besides, as described above, in this embodiment, the centers of respective gears of the speed reducing gear train are disposed within a virtual square with a substantially virtual line connecting the motor M and the crank shaft and the outer diameter of the motor as each side. Further, the reduction gears are arranged in a staggered configuration. By arranging in such a way, the members are properly disposed taking their balance into consideration, thus the auxiliary power drive means can be made compact.

The sensor of the leg power detecting means is disposed on the outer periphery of the crank shaft 13 in the casing, it is preferably positioned where an external force is hardly applied depending on the fitting of the device to the frame. Specifically, it is preferred that the sensor which is a precision part is mounted in a direction near the main pipe or seat tube for example where an external force is not applied even when the bicycle falls.

As described above, the casing 12 is made into one body by combining the three split casings 12a, 12b, 12c. But, this embodiment has made sure that the maximum width of the casing 12 can be determined to be the distance between the pedal arms, namely 120 mm or below, which is common for ordinary bicycles. This can be achieved because the driving force auxiliary device of this embodiment could be made compact.

And, since the single wiring extracting port (opening 12e) is formed on the casing 12 and the wirings 10a from the motor and sensor are taken out of the wiring extracting port, the wirings can be controlled easily.

The group of circuits on the side of the motor is connected to the connector disposed on the battery unit via the external connecting connector which is directly connected. Therefore, since the connection can be made without a cable, compacting and handling can be facilitated.

As shown in FIG. 14, the motor M and the circuit board of the control can also be disposed vertically along a seat tube 3b. This arrangement can be made because the power unit 11 of this embodiment can be made compact by reducing its length and width.

Figure 2:
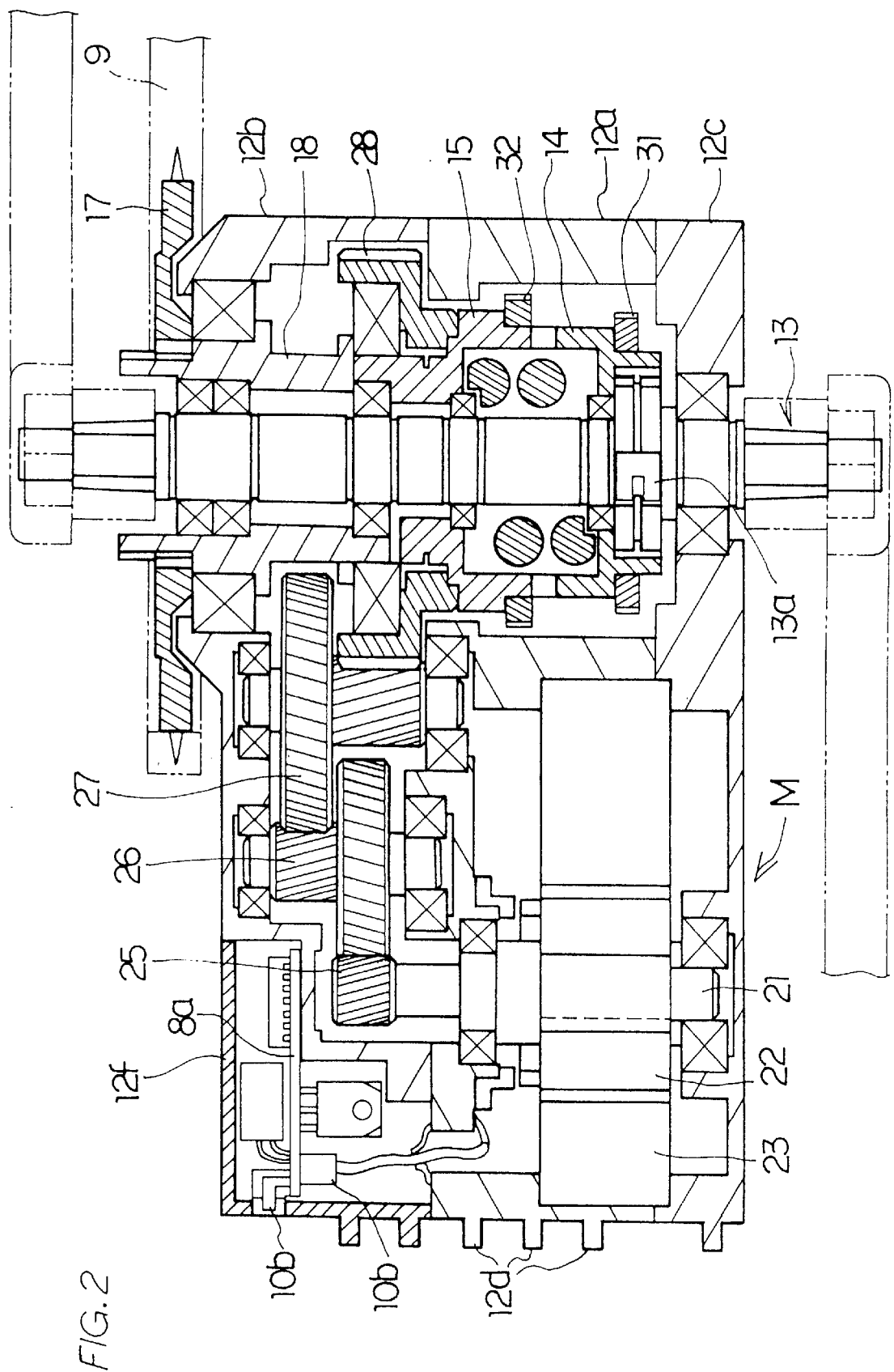
FIG. 2 is a transverse sectional view showing the power unit of the present invention.
Figure 3:
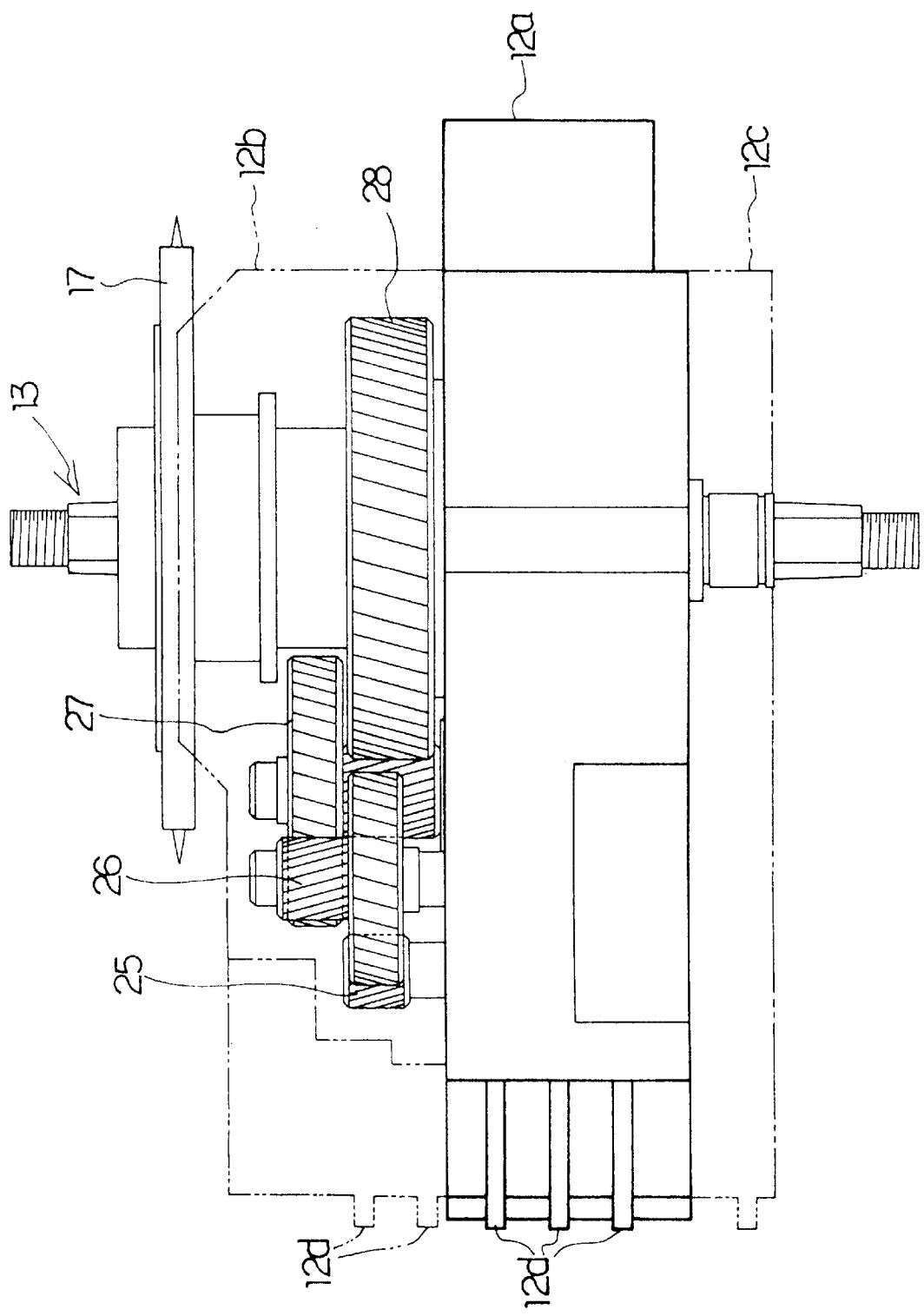
FIG. 3 is a plan view showing the power unit of the present invention with its casing partly removed.
Figure 15:
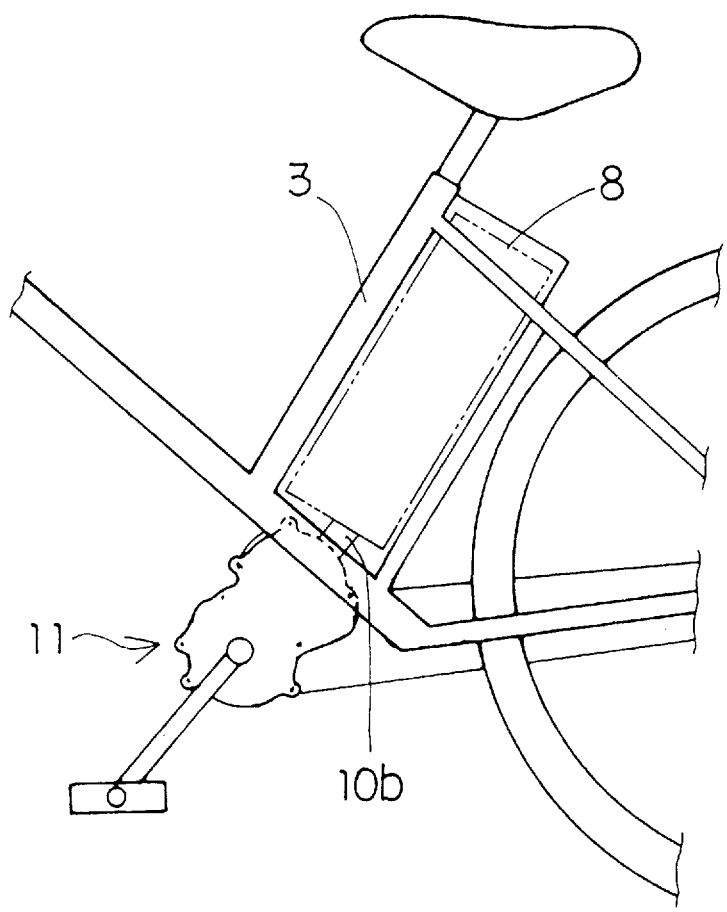
FIG. 15 is a front view showing a state that the power unit of the present invention is mounted on an electric bicycle.
Figure 16:
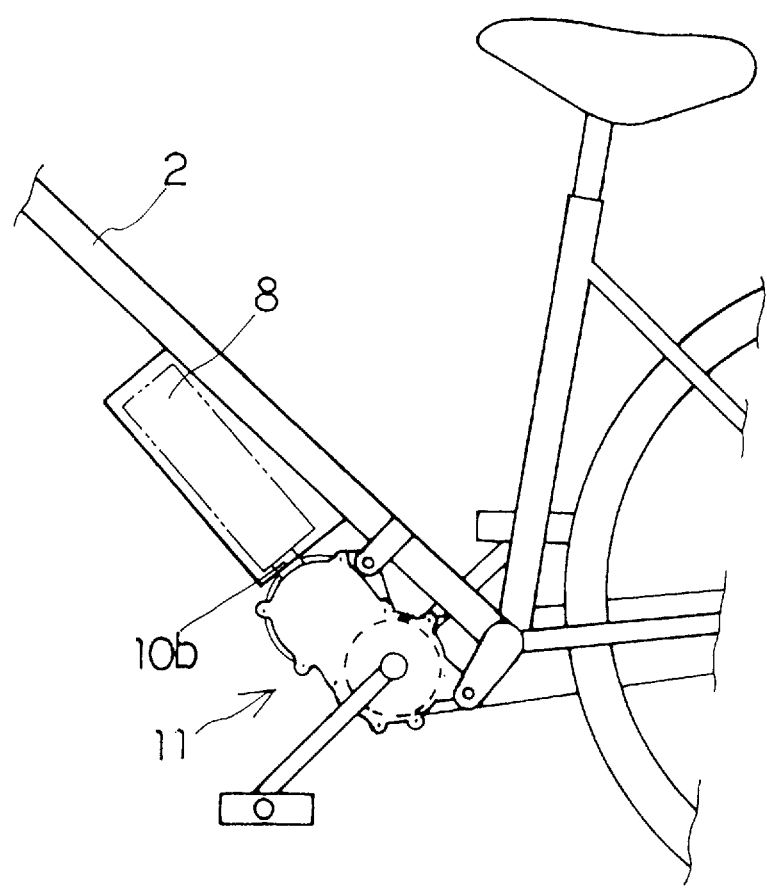
FIG. 16 is a front view showing a state that the power unit of the present invention is mounted on an electric bicycle.
Figure 17:
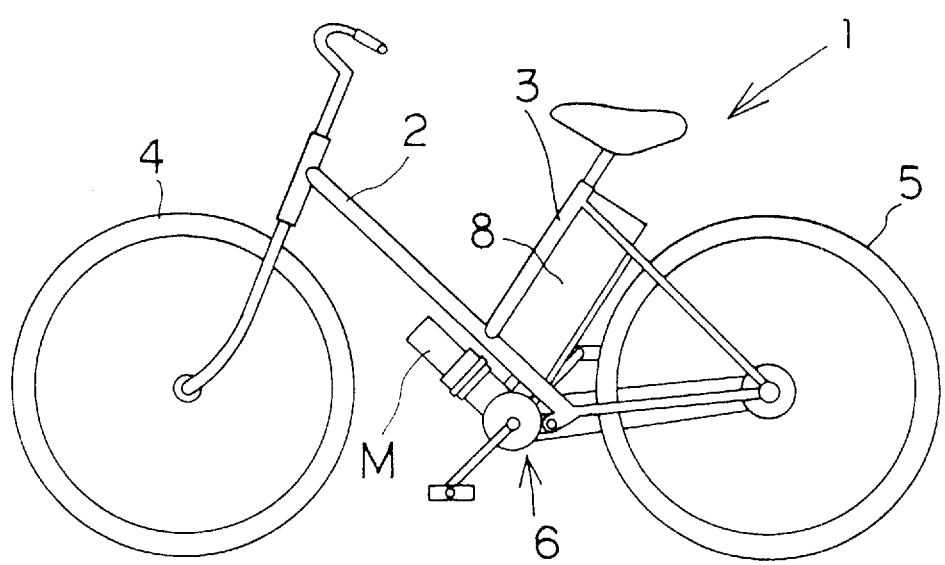
FIG. 17 is the entire schematic structural view showing a conventional electric bicycle.

And, as shown in FIG. 15 and FIG. 16 as well as FIG. 2, various ways may be taken in which wirings 10a from the motor M and sensors are connected with the circuit board 8a of the control via a connector 10b, or the motor M, the sensors and the circuit board 8a of the control are arranged within the casing and the wirings 10a from them are connected to the power supply disposed outside of the casing via the connector 10b, or the motor M and the circuit board 8a of the control are arranged at the front in the forward direction within the casing, or the power supply is disposed on a main pipe 3a and connected to the circuit board 8a of the control via the connectors 10b disposed on the top of the casing or the casing at the front in the forward direction.

According to the embodiment described above, the electric motor is not disposed in the longitudinal direction of the bicycle body but can be disposed in parallel with the crank shaft extending in the breadth direction, thereby eliminating the existing disadvantages that the reduction gear mechanism is complicated and made large because the rotation of the electric motor is required to be changed to the direction of the crank shaft and the converting mechanism therefor is disposed.

The conventional one which shows the driving force of manpower in the form of the torsion of the shaft and detects it has a very small torsional displacement magnitude due to torque, and needs the shaft with a prescribed length in the longitudinal direction, tending to have a large size. But, in this embodiment, the first and second rotors have the torsion coil spring within them, so that an appropriate torsional displacement magnitude can be attained even if the shaft does not have a sufficient length in the longitudinal direction, and a sufficient measuring precision can be secured.

Furthermore, the conventional one performs the detection at the position where the driving force of manpower is applied and needs the structure which withstands the great driving force of manpower, resulting in disadvantages that the device itself becomes large and very heavy. But, the present embodiment provides the structure to detect a difference in rotation at a position where the driving force of manpower is not applied, so that the device can be made compact, lightweight and inexpensive by using for example plastic small and lightweight gears.

And, since the leg force detecting means for detecting the driving force of manpower is accommodated into the casing, it is not exposed to the influences of external natural environments such as wind and rain and the direct influences such as dust or mud produced when the bicycle is running, thereby enabling to prevent the fear of deteriorating reliability such as false detection or shortening of the life of the device.

This embodiment has been described with reference to the application of the invention to a bicycle, but the invention can also be applied to light vehicles such as a boat which is driven by manpower.

INDUSTRIAL APPLICABILITY

The present invention is suitable for a driving force auxiliary device for lighter land vehicles such as an electric bicycle, and for lighter marine vessels such as a boat.

We claim:

1. A driving force auxiliary device for combining a manpower drive force and a motor drive force comprising a manpower drive means, an auxiliary power drive means, and a leg power detecting means, characterized in that:

said manpower drive means has a driving force transmitting mechanism having first and second rotors disposed on an outer periphery of a crank shaft to which a leg force is transmitted, said driving force transmitting mechanism containing a first one-way clutch and an elastic body for transmitting said manpower drive force, said auxiliary power drive means has a motor and a reduction gear mechanism, the motor drive force from said motor is added to said driving force transmitting mechanism at the outer periphery of said crank shaft via a second one-way clutch, said leg power detecting means has sensor means for detecting a difference in rotation between the first and second rotors which are disposed at front and rear ends of a power transmitting route of said elastic body, and that said reduction gear mechanism of said auxiliary power drive means comprises reduction gears which are arranged in a staggered configuration.

2. A driving force auxiliary device according to claim 1, wherein centers of said reduction gears are disposed within a substantially virtual square defined by a vertical line running through said crank shaft, a pair of parallel lines connecting the motor M and the vertical line, and a semicircular circumference of the motor.

3. A driving force auxiliary device according to claim 1, wherein said leg power detecting means comprises a differential gear mechanism, said first and second rotors are interconnected with two shafts of said differential gear mechanism, and a third shaft of said differential gear mechanism is interconnected with a sensor.

4. A driving force auxiliary device according to claim 3 wherein a mechanism for mechanically increasing the rotation is disposed in at least one of a space between said first and second rotors and said differential gear mechanism and a space between said differential gear mechanism and said sensor means.

5. A driving force auxiliary device according to claim 1, wherein said leg power detecting means uses an encoder for said sensor means, said encoder counts the numbers of revolutions of said first and second rotors, and manpower torque is judged from a difference between the counted numbers of revolutions.

6. A driving force auxiliary device for combining a manpower drive force and a motor drive force comprising a manpower drive means, an auxiliary power drive means, and a leg power detecting means, characterized in that:
said manpower drive means includes
a first rotor which is coaxially disposed on an outer periphery of a crank shaft and provided with a first one-way clutch to receive a turning force in a forward direction of said crank shaft,
a second rotor which is coaxially disposed to freely rotate on the outer periphery of said crank shaft,
an elastic body which is fitted between said first rotor and said second rotor to transmit a turning force of said first rotor to the second rotor, and
an output gear which receives a turning force of said second rotor;
said auxiliary power drive means includes
a motor,
a speed reducing gear train for reducing the motor drive force of said motor, and
a third rotor which is coaxially disposed to freely rotate on the outer periphery of said crank shaft, and has an outer periphery teeth engaged with a final gear of said speed reducing gear train and a second one-way clutch disposed on an inner periphery thereof to transmit only a turning force in the forward direction of said final gear to said second rotor; and
said leg power detecting means includes
a first rotor member fixed to an outer periphery of said first rotor,
a second rotor member fixed to an outer periphery of said second rotor,
a pair of first and second bevel gears which is interconnected with said first and second rotor members respectively,
a third bevel gear which is fitted to be engaged between said pair of first and second bevel gears,
an output shaft which takes out a change in rotation of a supporting shaft for supporting said third bevel gear with respect to said pair of first and second bevel gears as a difference in motion between said first and second bevel gears, and
a sensor connected to said output shaft.

7. A driving force auxiliary device according to claim 1 or 6, wherein a speed detecting means is fitted to any one of said manpower drive means, said auxiliary power drive means, and said leg power detecting means.

8. A driving force auxiliary device according to claim 1 or 6, wherein said manpower drive means, said auxiliary power drive means, and said leg power detecting means are accommodated in a casing composed of three split-casings, with said first and second rotors of said manpower drive means, said motor of said auxiliary power drive means, and said sensor means of said leg power detecting means accommodated in said casing.

9. A driving force auxiliary device according to claim 8, wherein said casing is provided with fins.

10. A driving force auxiliary device according to claim 8, wherein the motor of said auxiliary power drive means and said leg power detecting means are disposed on one side of said casing, and the gear train of said auxiliary power drive means is disposed on the other side.

11. A driving force auxiliary device according to claim 8, wherein a maximum width of said casing is determined to be equal to or smaller than the distance between pedal arms of an ordinary bicycle.

12. A driving force auxiliary device according to claim 8 wherein a single wiring extracting port is formed on said casing and the wirings from said motor and sensor means are taken out of said wiring extracting port.

13. A driving force auxiliary device according to claim 8, wherein said motor and the circuit board of the control are disposed at a surface of said casing.

14. A driving force auxiliary device according to claim 8, wherein a motor drive circuit and a circuit board of the control are disposed near said motor and in vincinity of the reduction gear mechanism.

15. A driving force auxiliary device according to claim 14, wherein an opening is formed on the casing faced to said circuit board, a connector is disposed on said circuit board, and said connector is disposed to face said opening.

16. A driving force auxiliary device according to claim 8, wherein the power supply is disposed on a main pipe, and said power supply and a circuit board of a control are connected by a connector disposed above the casing.

17. A driving force auxiliary device according to claim 1 or 6, wherein said elastic body is a torsion coil spring.

18. A driving force auxiliary device according to claim 1 or 6, wherein said elastic body is a torsion coil spring, end faces of said coil spring are radiused, and a member for restricting deformation of the coil spring is disposed.

19. A driving force auxiliary device according to claim 18, wherein portions for receiving the end faces of said coil spring are formed in said first and second rotors, and said portions for receiving the end faces of said coil spring are formed in a curved shape.

20. A driving force auxiliary device according to claim 18, wherein an angle of torsion of said torsion coil spring is determined to be 15 degrees or below and when the angle of torsion exceeds the above level, side face of respective protrusions formed on said first and second rotors are contacted mutually.

21. A driving force auxiliary device according to claim 1 or 6, wherein the motor of said auxiliary power drive means has ends of poles formed in the radial direction of the stator core fixed to a casing.

22. A driving force auxiliary device according to claim 1, wherein the sensor means of said leg power detecting means are disposed on outer peripheries of said first and second rotors for detecting rotation of said first and second rotors.

23. A driving force auxiliary device according to claim 1 or 9, wherein wirings from said motor and sensor means are connected with a motor drive circuit and a circuit board of a control via a first connector, and said circuit board and a power supply are connected via a second connector.

24. A driving force auxiliary device according to claim 1 or 8 wherein said motor, said sensor means, and a circuit board of a control are arranged within the casing, and wirings from them are connected to a power supply disposed outside of the casing via a first connector.

25. A driving force auxiliary device according to claim 24, wherein said power supply is disposed on a main pipe, said casing is disposed with said motor beside said power supply, and a wiring from said circuit board is connected to said power supply via a second connector.

26. A driving force auxiliary device according to claim 24, wherein said power supply is disposed on a seat tube, said casing is disposed with said motor beside said power supply, and a wiring from said circuit board is connected to said power supply via a second connector.

* * * * *